(12) United States Patent
Kodama

(10) Patent No.: US 10,661,609 B2
(45) Date of Patent: May 26, 2020

(54) AGRICULTURAL MACHINERY PNEUMATIC TIRE

(71) Applicant: BRIDGESTONE CORPORATION, Tokyo (JP)

(72) Inventor: Takashi Kodama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 396 days.

(21) Appl. No.: 15/117,871

(22) PCT Filed: Feb. 20, 2015

(86) PCT No.: PCT/JP2015/054848
§ 371 (c)(1),
(2) Date: Aug. 10, 2016

(87) PCT Pub. No.: WO2015/125935
PCT Pub. Date: Aug. 27, 2015

(65) Prior Publication Data
US 2017/0008351 A1 Jan. 12, 2017

(30) Foreign Application Priority Data
Feb. 20, 2014 (JP) .................................. 2014-031077

(51) Int. Cl.
*B60C 15/024* (2006.01)
*B60C 15/06* (2006.01)

(52) U.S. Cl.
CPC ........ *B60C 15/0603* (2013.01); *B60C 15/024* (2013.01); *B60C 15/0628* (2013.01);
(Continued)

(58) Field of Classification Search
None
See application file for complete search history.

(56) References Cited

U.S. PATENT DOCUMENTS 5,332,016 A * 7/1994 Tsuruta .................. B60C 13/00
152/523
6,318,431 B1 * 11/2001 Ueyoko .................... B60C 3/04
152/539
(Continued)

FOREIGN PATENT DOCUMENTS

EP 0486261 A1 5/1992
EP 0798139 A2 10/1997
(Continued)

OTHER PUBLICATIONS

Mar. 13, 2017 Office Action issued in Chinese Patent Application No. 201580008814.2.
(Continued)

*Primary Examiner* — Kendra Ly
(74) *Attorney, Agent, or Firm* — Oliff PLC

(57) ABSTRACT

A recessed portion is formed in each tire side portion of an agricultural machinery pneumatic tire. Rigidity at the part of each tire side portion where the recessed portion is formed is reduced. This enables each tire radial direction outside portion to be made to tilt over toward tire width direction outside with the recessed portion as a point of origin without reducing the internal pressure, enabling the ground contact width of a tread portion to be enlarged. Since there is no need to intentionally reduce the internal pressure in order to reduce the ground contact pressure, bead portions do not tilt over more than necessary, and there is no reduction in the durability of the bead portions.

6 Claims, 3 Drawing Sheets

(52) U.S. Cl.
CPC ............... *B60C 2015/061* (2013.01); *B60C 2015/0614* (2013.01); *B60C 2015/0621* (2013.01); *B60C 2200/08* (2013.01)

(56) References Cited

U.S. PATENT DOCUMENTS

| | | | |
|---|---|---|---|
| 6,508,285 B2 * | 1/2003 | Ueyoko | ............... B60C 13/00 |
| | | | 152/454 |
| 2002/0153080 A1 | 10/2002 | Yamaguchi | |
| 2013/0034906 A1 | 2/2013 | Smith et al. | |
| 2014/0311650 A1 | 10/2014 | Sugiyama et al. | |

FOREIGN PATENT DOCUMENTS

| | | |
|---|---|---|
| EP | 1201464 A2 | 5/2002 |
| JP | H06-80004 A | 3/1994 |
| JP | 2002-120521 A | 4/2002 |
| JP | 2011-148393 A | 8/2011 |
| JP | 2013-237344 A | 11/2013 |
| WO | 2013/094300 A1 | 6/2013 |
| WO | 2014/004043 A1 | 1/2014 |

OTHER PUBLICATIONS

Feb. 1, 2017 Search Report issued in European Patent Application No. 15752889.4.
Apr. 14, 2015 International Search Report issued in International Patent Application No. PCT/JP2015/054848.

* cited by examiner

AGRICULTURAL MACHINERY PNEUMATIC TIRE

TECHNICAL FIELD

The present invention relates to an agricultural machinery pneumatic tire.

BACKGROUND ART

Agricultural machinery pneumatic tires are mounted to agricultural tractors that run on cultivated fields (see, for example, Japanese Patent Application Laid-Open (JP-A) No. 2011-148393).

SUMMARY OF INVENTION

Technical Problem

When tires running on a cultivated field compact the cultivated field after crop seed has been sown, growth of the crop is impaired and there is a negative impact on the amount harvested. There is accordingly a demand for low-compaction performance that reduces ground contact pressure.

Conventionally, in order to reduce the ground contact pressure per unit surface area of the tire, a method has been adopted in which the internal pressure is intentionally reduced to below a recommended vehicle value to increase the tilt of bead portions and thereby increase the ground contact surface area of the tire. However, if the internal pressure is lowered under high load conditions, strain at a back face side (tire width direction outside) of folded-back portions of a carcass ply is greatly increased at the bead portions, which causes the durability of the bead portions to be negatively affected. Thus, it has been difficult to achieve both bead portion durability and low compaction in conventional technology, and there is room for improvement regarding this.

In consideration of the above circumstances, an object of the present invention is to provide an agricultural machinery pneumatic tire capable of achieving both low compaction and bead portion durability.

Solution to Problem

An agricultural machinery pneumatic tire according to a first aspect includes: a left and right pair of bead portions that are provided on each side of a tire equatorial plane; a bead core that is embedded in each of the bead portions; a carcass that is formed of at least one carcass ply including a main body portion spanning from one of the bead cores to another of the bead cores, and a folded-back portion folded back from a tire radial direction inside toward a tire radial direction outside about each of the bead cores; a side rubber layer disposed at a tire width direction outside of the carcass; bead filler that is disposed between the main body portion and the folded-back portion, that extends tapering from the bead cores toward the tire radial direction outside, and that is formed of a rubber set with a higher modulus at 100% elongation than a rubber configuring the side rubber layer; a bent face portion that is formed at the bead portions so as to face a flange of a rim and that is formed in a recessed shape as viewed in a tire width direction cross-section; a side reinforcing rubber layer that is disposed at the tire width direction outside of the carcass, that includes the bent face portion and extends from the bent face portion toward the tire radial direction outside, and that is formed of a rubber set with a higher modulus at 100% elongation than the rubber configuring the side rubber layer; a shock-absorbing rubber layer that is provided between the side reinforcing rubber layer and the carcass and that is formed of a rubber set with a lower modulus at 100% elongation than the rubber configuring the side reinforcing rubber layer; and a recessed portion that, in a mounted position in which the tire is mounted to an applicable rim and inflated to a maximum air pressure in an unladen state and as viewed in a tire width direction cross-section, has a maximum depth portion disposed at an outer face of the side rubber layer, between a normal line HL1 that passes through a maximum width position P, P being a maximum width position of the main body portion, and is orthogonal to a tangent line of a tire outer outline, and a normal line HL2 that passes through a tire radial direction outside end of the bead filler and is orthogonal to a tangent line of the tire outer outline.

In the agricultural machinery pneumatic tire according to the first aspect, since the recessed portion is formed in the outer face of the side rubber layer, rigidity at the part of the side rubber layer where the recessed portion is formed is reduced. This enables a portion that is further toward the tire radial direction outside than the recessed portion to be made to tilt over toward the tire width direction outside with the recessed portion as a point of origin, without reducing the internal pressure. This enables a ground contact width of the tread portion to be enlarged, there enabling ground contact pressure per unit surface area of a ground contact face to be reduced.

The bead portions can be reinforced by the side reinforcing rubber layer formed of the rubber set with a higher modulus at 100% elongation than the rubber configuring the side rubber layer, thereby enabling the bead portions to be suppressed from tilting over. The shock-absorbing rubber layer that is formed of the rubber set with a lower modulus at 100% elongation than the rubber configuring the side reinforcing rubber layer is disposed between the side reinforcing rubber layer and the carcass, thereby enabling strain between the side reinforcing rubber layer and the carcass to be alleviated.

In the agricultural machinery pneumatic tire according to the first aspect, since there is no need to intentionally reduce the internal pressure in order to reduce ground contact pressure, the bead portions do not tilt over more than required, and there is no reduction in the durability of the bead portions. Moreover, since the bead portions are reinforced by the side reinforcing rubber layer extending from the bent face portion facing the flange of the rim toward the tire radial direction outside, and formed of the rubber set with a higher modulus at 100% elongation than the rubber configuring the side rubber layer, the durability of the bead portions is improved.

In the agricultural machinery pneumatic tire according to the first aspect, the maximum depth portion of the recessed portion is disposed between the normal line HL1 that passes through the maximum width position P and is orthogonal to a tangent line of a tire outer outline, and the normal line HL2 that passes through the tire radial direction outside end of the bead filler and is orthogonal to a tangent line of a tire outer outline. Thus, the maximum depth portion of the recessed portion and the tire radial direction outside end of the bead filler are separated from each other in the tire radial direction, and strain in the vicinity of the maximum depth portion of the recessed portion does not overlap with strain in the vicinity of the tire radial direction outside end of the bead filler.

The invention according to a second aspect is the agricultural machinery pneumatic tire according to the first aspect, wherein at least part of the shock-absorbing rubber layer is disposed between the carcass and a part of the side rubber layer where the maximum depth portion of the recessed portion is formed.

A side portion of the tire has the largest strain at the deepest portion of the recessed portion. In the agricultural machinery pneumatic tire according to the second aspect, the shock-absorbing rubber layer is disposed between the carcass and the part of the side rubber layer where the maximum depth portion of the recessed portion is formed. Thus, strain on the side rubber layer is suppressed by the shock-absorbing rubber layer from being transmitted to the carcass.

The invention according to a third aspect is the agricultural machinery pneumatic tire according to the first aspect or the second aspect, wherein the maximum depth d of the recessed portion is set within a range of from 10% to 26% of an average thickness G of a tire side portion between the normal line HL2 and the normal line HL1.

By setting the maximum depth of the recessed portion at 10% of the average thickness G of the tire side portion or greater, the reduction in ground contact pressure exceeds 10%. Note that if the recessed portion is too deep, the tire side portion tilts over too much and the durability of the bead portions is reduced. By keeping the maximum depth d of the recessed portion at 26% of the average thickness G of the tire side portion or less, the reduction in durability of the bead portions can be kept at 3% or less.

The invention according to a fourth aspect is the agricultural machinery pneumatic tire according to any one of the first aspect to the third aspect, wherein a ply end of the folded-back portion is positioned further toward the tire radial direction outside than the recessed portion.

The tire side portion tilts over with the recessed portion as a point of origin, such that strain occurs at the periphery of the recessed portion. Disposing the ply end of the folded-back portion further toward the tire radial direction outside than the recessed portion where strain occurs enables separation occurring from the ply end of the folded-back portion to be suppressed.

The invention according to a fifth aspect is the agricultural machinery pneumatic tire according to any one of the first aspect to the third aspect, wherein in an unladen state mounted to an applicable rim and inflated to a maximum air pressure, the shock-absorbing rubber layer is laid up further toward a tire width direction inside than a line segment PQ linking the maximum width position P to an inflection point Q, Q being an inflection point between the bent face portion formed in a recessed shape and a bead heel curving in a bulge toward the tire outside.

Laying up the shock-absorbing rubber layer further toward the tire width direction inside than the line segment PQ enables a shock-absorbing function to be exhibited by the shock-absorbing rubber layer, without impairing the reinforcing function of the side reinforcing rubber layer.

Advantageous Effects of Invention

As explained above, the agricultural machinery pneumatic tire of the present invention has an excellent advantageous effect of being capable of achieving both low compaction and bead portion durability.

DESCRIPTION OF EMBODIMENTS

Figure 1:
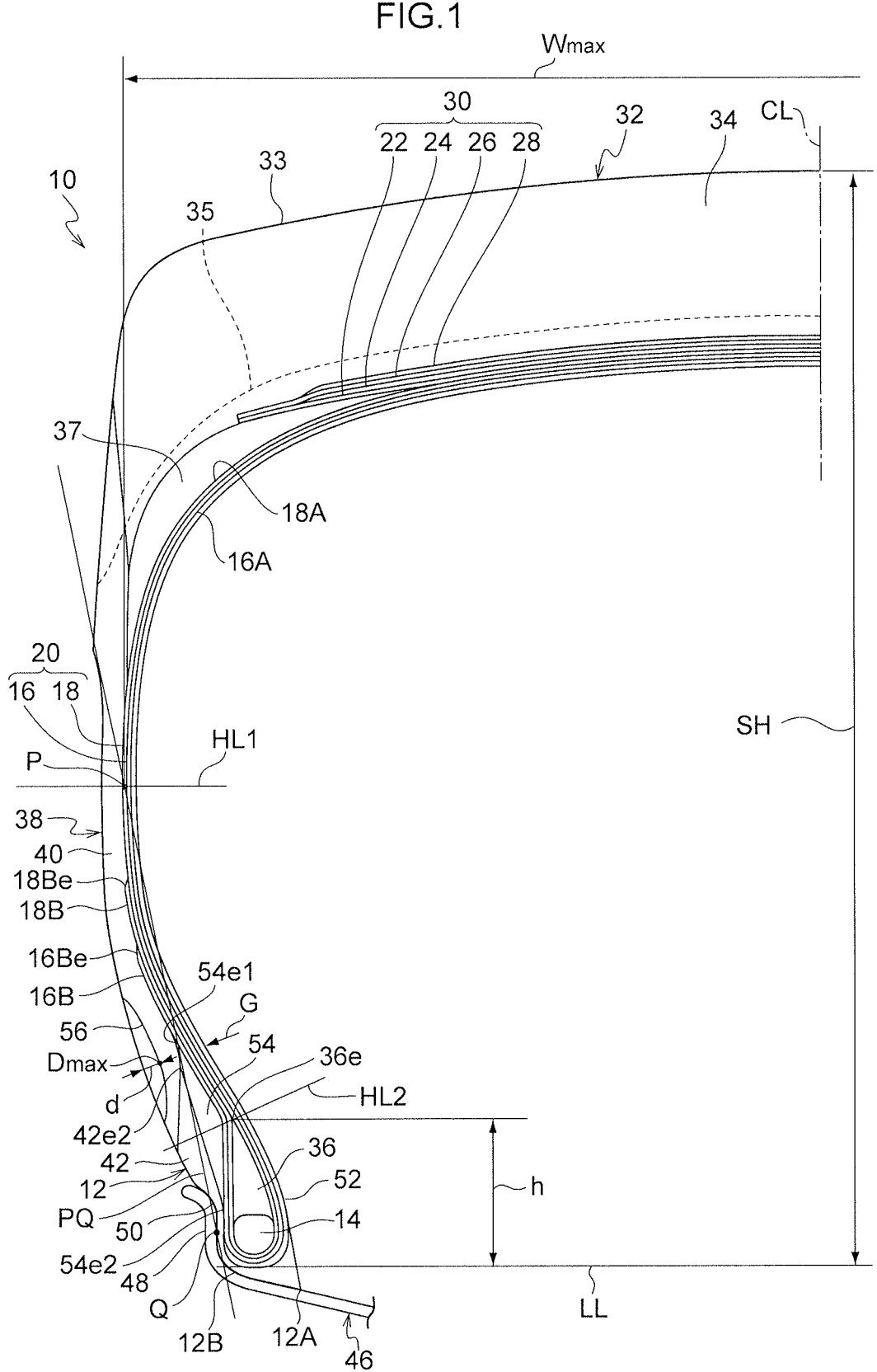
FIG. 1 is a cross-section taken along a tire rotation axis, illustrating one tire equatorial plane side half of an agricultural machinery pneumatic tire according to a first exemplary embodiment.

Explanation follows regarding an agricultural machinery pneumatic tire 10 according to an exemplary embodiment of the present invention, with reference to FIG. 1. The agricultural machinery pneumatic tire 10 of the present exemplary embodiment is mounted to an agricultural machine driven on cultivated fields, such as an agricultural tractor, and is employed with a lower internal pressure than tires other than agriculture machinery tires, such as truck or bus tires.

FIG. 1 shows a tire equatorial plane CL left side half of the agricultural machinery pneumatic tire 10 of the present exemplary embodiment, in a cross-section taken along a rotation axis. The agricultural machinery pneumatic tire 10 includes bead cores 14 that are respectively embedded in a left and right pair of bead portions 12, a carcass 20 formed of a first carcass ply 16 spanning from one bead core 14 to the other bead core 14 and a second carcass ply 18 disposed at the tire outside of the first carcass ply 16, and a belt 30 formed of plural belt plies 22, 24, 26, 28 disposed at a tire radial direction outside of the carcass 20. The first carcass ply 16 and the second carcass ply 18 each have a general structure in which plural cords are covered in coating rubber. The belt plies 22, 24, 26, 28 also each have a general structure in which plural cords are covered in coating rubber.

Examples of a cord material of the first carcass ply 16 and the second carcass ply 18 includes steel or organic fibers. In cases of a radial carcass, the cords are arrayed at an angle of from 70° to 90° with respect to a tire circumferential direction. Examples of a cord material of the belt plies 22, 24, 26, 28 include steel.

A tread rubber layer 34 forming a tread portion 32 is provided at the tire radial direction outside of the belt 30. Plural lugs 33 are formed in the tread portion 32. Note that the dotted line in FIG. 1 indicates a groove bottom 35. Note that a preferable range of the modulus at 100% elongation of the tread rubber layer 34 is from 2.5 MPa to 7.0 MPa.

The vicinity of end portions at both tire width direction sides of the belt 30 are separated from the carcass 20, and a cushioning rubber 37 is provided between the vicinity of the end portions at both tire width direction sides of the belt 30 and the carcass 20.

Both tire width direction end sides of the first carcass ply 16 are folded back around the respective bead cores 14 from the tire radial direction inside toward the tire radial direction outside, such that a portion spanning from one bead core 14 to the other bead core 14 configures a main body portion 16A, and portions folded back from the bead cores 14 toward the tire radial direction outside respectively configure folded-back portions 16B.

The second carcass ply 18 at the tire outside of the first carcass ply 16 is disposed similarly to the first carcass ply, such that a portion spanning from one bead core 14 to the other bead core 14 configures a main body portion 18A, and portions folded back from the bead cores 14 toward the tire radial direction outside respectively configure folded-back portions 18B.

In a mounted position in which the tire is mounted to an applicable rim 46 and inflated to a maximum air pressure in an unladen state, a folded-back end 16Be of each folded-back portion 16B of the first carcass ply 16 is positioned further toward the tire radial direction inside than a maximum width position P located at a tire maximum width Wmax of the main body portion 18A of the second carcass ply 18, and further toward the tire radial direction outside than a tire radial direction outside end 36e of bead filler 36. Note that strictly speaking, the main body portion 18A has a thickness, and so the maximum width position P is located at an intermediate position of this thickness. A folded-back end 18Be of each folded-back portion 18B of the second carcass ply 18 is positioned further toward the tire radial direction inside than the maximum width position P, and further toward the tire radial direction outside than the folded-back end 16Be of the folded-back portion 16B of the first carcass ply 16.

In the present specification, the "maximum air pressure" refers to the air pressure corresponding the maximum load (maximum load capacity) for a single wheel of an applicable size listed in the following Standards. Moreover, the "applicable rim" is a standard rim (or "Approved Rim", "Recommended Rim") of the applicable size as listed in the same Standard. The applicable agricultural Standard is determined according to the Standards prevailing in the region of tire manufacture or use, for example, as stipulated in "The Year Book of the Tire and Rim Association Inc." in the United States of America, in the "Standards Manual of the European Tyre and Rim Technical Organisation" in Europe, and in the "JATMA Year Book" of the Japan Automobile Tire Manufacturers Association in Japan.

The bead filler 36 is provided extending from the bead cores 14 toward the tire radial direction outside between the main body portion 16A and the folded-back portions 16B of the first carcass ply 16, with a thickness that gradually decreases on progression toward the tire radial direction outside. A height h of the tire radial direction outside end 36e of each bead filler 36 measured along the tire radial direction from a rim diameter line LL is preferably set within a range of from 13% to 25% of a tire cross-section height SH from the rim diameter line LL. Note that the "rim diameter line LL" is a position where the rim diameter is measured. The "tire cross-section height SH" is the (tire outer diameter–rim diameter)×½.

Note that the modulus at 100% elongation of the bead filler 36 is set higher than the modulus at 100% elongation of side rubber layers 40, and the modulus at 100% elongation of the bead filler 36 is preferably within a range of from 4.0 MPa to 9.0 MPa.

Tire side portions 38, and the side rubber layers 40 that extend along the tire radial direction to form the bead portions 12, are disposed at the tire width direction outsides of the carcass 20. Note that a tire radial direction outside portion of each side rubber layer 40 gradually decreases in thickness on progression toward the tire radial direction outside so that rigidity does not change suddenly, and is disposed at the tire width direction outside of the tread rubber layer 34 and the cushioning rubber 37.

A tire radial direction intermediate portion of each side rubber layer 40 covers part of the main body portion 18A of the second carcass ply 18, part of the folded-back portion 16B, and part of the folded-back portion 18B.

A tire radial direction inside portion of each side rubber layer 40 gradually decreases in thickness on progression toward the tire radial direction inside so that rigidity does not change suddenly. The modulus at 100% elongation of the side rubber layers 40 is preferably within a range of from 2.5 MPa to 7.0 MPa.

A side reinforcing rubber layer 42, extending toward the tire radial direction inside from the tire width direction inside of the portion of the respective side rubber layer 40 that gradually decreases in thickness at the tire radial direction inside, is disposed at the tire width direction outside of each folded-back portion 16B. Note that the side reinforcing rubber layer 42 of the present exemplary embodiment extends as far as a bead toe 12A.

A recess-shaped bent face portion 50 that is in close contact with a flange 48 of the applicable rim 46 is formed on the surface of the side reinforcing rubber layer 42 at the respective bead portion 12. The side reinforcing rubber layer 42 needs to withstand input from the flange 48, and so the bent face portion 50 is formed facing the side reinforcing rubber layer 42.

The side reinforcing rubber layers 42 have a reinforcing function in order to prevent cracks from occurring in the bead portions 12 due to repeated deformation of the bead portions 12 when rolling under load. A modulus at 100% elongation of the side reinforcing rubber layers 42 is thereby set higher than a modulus at 100% elongation of the side rubber layers 40. The modulus at 100% elongation of the side reinforcing rubber layer 42 is preferably within a range of from 3.0 MPa to 5.0 MPa.

A shock-absorbing rubber layer 54 is provided between the tire width direction outside of each folded-back portion 18B and the respective side reinforcing rubber layer 42. If the rigidity of the bead portions 12 at the side reinforcing rubber layers 42 is raised excessively, there is a concern of strain (due to shear force) increasing due to a difference in rigidity between the side reinforcing rubber layers 42 and the carcass 20, and so conversely cracks are more liable to occur. Thus, a strain-absorbing function is performed by disposing the soft shock-absorbing rubber layer 54 with a low modulus at 100% elongation between each side reinforcing rubber layer 42 and the carcass 20.

From this perspective, the modulus at 100% elongation of the shock-absorbing rubber layers 54 is set lower than the modulus at 100% elongation of the side rubber layers 40. The modulus at 100% elongation of the shock-absorbing rubber layers 54 is preferably set within a range of from ⅓ to ½ of the modulus at 100% elongation of the side reinforcing rubber layers 42. The modulus at 100% elongation of the shock-absorbing rubber layers 54 is also preferably set within a range of from ½ to 1 times the modulus at 100% elongation of the coating rubber of the carcass 20. The modulus at 100% elongation of the shock-absorbing rubber layer 54 is preferably set within a range of from 1.0 MPa to 3.5 MPa.

Each folded-back portion 16B of the first carcass ply 16 and each folded-back portion 18B of the second carcass ply 18 extend along the main body portion 18A, the main body portion 16A, and the bead filler 36 with a triangular shaped cross-section and thickness that gradually decreases on progression toward the tire radial direction outside. Moreover, tire outer face sides in close proximity to the tire radial direction outside end 36e of the bead filler 36 bend so as to form a hollow, thereby enabling the shock-absorbing rubber layer 54 to be disposed in this hollow portion. The shock-absorbing rubber layer 54 of the present exemplary embodiment is formed with the greatest thickness at a tire radial direction center portion disposed in close proximity to the tire radial direction outside end 36e of the bead filler 36, and with a thickness that gradually decreases on progression toward the tire radial direction outside and tire radial direction inside, such that rigidity does not change suddenly.

A tire radial direction outside portion of the shock-absorbing rubber layer 54 extends further toward the tire radial direction outside than a tire radial direction outside end 42e1 of the respective side reinforcing rubber layer 42, and a tire radial direction inside portion of the shock-absorbing rubber layer 54 extends as far as the tire width direction inside of the bent face portion 50. Namely, the shock-absorbing rubber layer 54 is interposed between the carcass 20 and the respective side reinforcing rubber layer 42 further toward the tire radial direction outside than the bent face portion 50, such that the side reinforcing rubber layer 42 further toward the tire radial direction outside than the bent face portion 50 does not directly contact the carcass 20.

In a mounted position of the tire in which the agricultural machinery pneumatic tire 10 is mounted to the applicable rim 46 and inflated to the tire Standard maximum air pressure in an unladen state, as viewed in a tire width direction cross-section passing through the tire rotation axis (not illustrated in FIG. 1), the shock-absorbing rubber layer 54 is disposed further toward the tire width direction inside than a line segment PQ that links the maximum width position P of the second carcass ply 18 to an inflection point Q. The inflection point Q is a boundary position between a bead heel (having its center of curvature at the tire inside) 12B and the bent face portion (having its center of curvature at the tire outside) 50.

A recessed portion 56 is formed continuously around the circumferential direction in an outer face of each side rubber layer 40. A maximum depth portion Dmax of the recessed portion 56 is preferably positioned between a normal line HL1 that passes through the maximum width position P of the second carcass ply 18 at a right angle to a tangent line contacting a tire outer outline, and a normal line HL2 that passes through the tire radial direction outside end 36e of the bead filler 36 at a right angle to a tangent line contacting a tire outer outline. Preferably, at least part of the shock-absorbing rubber layer 54 overlaps the maximum depth portion Dmax of the recessed portion 56 in tire side-on view. Namely, the maximum depth portion Dmax of the recessed portion 56 is preferably disposed between a tire radial direction outside end 54e1 and a tire radial direction inside end 54e2 of the shock-absorbing rubber layer 54 in tire side-on view. The shock-absorbing rubber layer 54 is thereby interposed between the maximum depth portion Dmax of the recessed portion 56 and the carcass 20.

Note that the folded-back end 16Be of the folded-back portion 16B of the first carcass ply 16 and the folded-back end 18Be of the folded-back portion 18B of the second carcass ply 18 are disposed in positions that do not overlap with the respective recessed portion 56 in tire side-on view.

Note that, as long as the maximum depth portion Dmax is formed in the above-described range, part of the recessed portion 56 may be formed further toward the tire radial direction outside than the normal line HL1, or may be formed further toward the tire radial direction inside than the normal line HL2.

Figure 2:
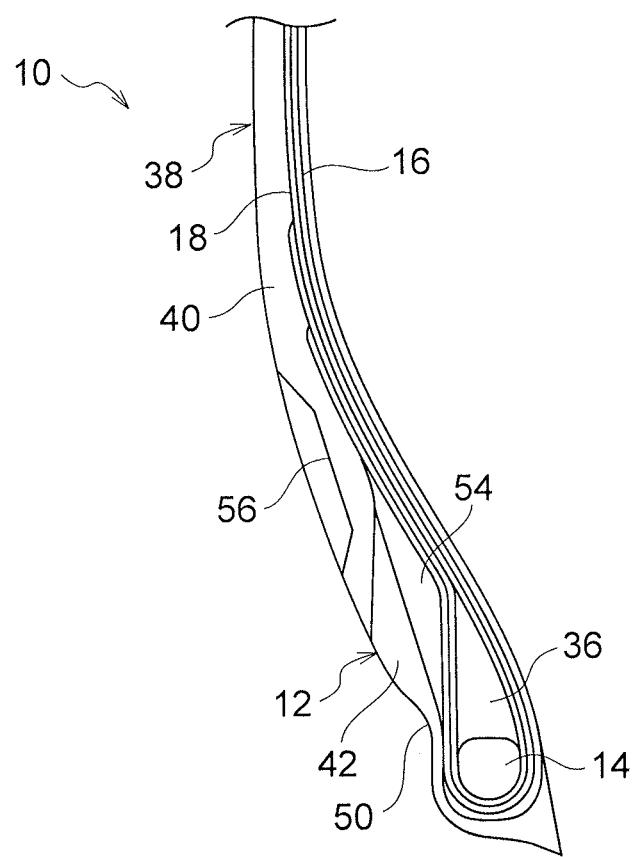
FIG. 2 is a cross-section taken along a tire rotation axis, illustrating one tire equatorial plane side half of an agricultural machinery pneumatic tire according to another exemplary embodiment.

A cross-section profile of the recessed portion 56 preferably becomes gradually shallower in depth on progression toward both tire radial direction sides, such as a substantially circular arc shape with a center of curvature at the tire outer face side as illustrated in FIG. 1, such that there is no localized concentration of stress. Note that, as illustrated in FIG. 2, the cross-section profile of the recessed portion 56 may have a shape that is formed with a substantially constant depth overall and that gradually becomes shallower at both tire radial direction end portions.

A maximum depth (depth at the maximum depth portion Dmax) d of the recessed portion 56 is preferably set within a range of from 10% to 26% of an average thickness G of the tire side portion 38 between the normal line HL2 and the normal line HL1.

An inner liner 52 is provided at a tire inner face side of the carcass 20. The inner liner 52 of the present exemplary embodiment extends along the first carcass ply 16 as far as the tire radial direction inside of the bead cores 14.

Each side portion of the agricultural machinery pneumatic tire 10 decreases in gauge from the bent face portion 50 to the normal line HL1, and increases in gauge from the normal line HL1 to the tire radial direction outside.

Operation and Advantageous Effects

Explanation follows regarding operation and advantageous effects of the agricultural machinery pneumatic tire 10 of the present exemplary embodiment.

After the agricultural machinery pneumatic tire 10 is mounted to an agricultural machine, such as an agricultural tractor, and load acts on the agricultural machinery pneumatic tire 10, the bead portions 12 that are directly below the rotation axis of the agricultural machinery pneumatic tire 10 tilt over toward the tire width direction outsides, and the tire side portions bulge out in the tire width direction.

In the agricultural machinery pneumatic tire 10 of the present exemplary embodiment, since the recessed portion 56 is formed in each tire side portion 38, rigidity at a part of the tire side portion 38 where the recessed portion 56 is formed is reduced. This enables a tire radial direction outside portion with the recessed portion 56 as a point of origin, more specifically, a range from the recessed portion 56 as far as the normal line HL1, to be made to tilt over toward the tire width direction outside without reducing the internal pressure, thereby enabling a ground contact width of the tread portion 32 to be enlarged.

Since the ground contact surface area of the tread portion 32 is enlarged due to the ground contact width of the tread portion 32 being enlarged, ground contact pressure per unit surface area of the ground contact face is reduced and load per unit surface area of a cultivated field is reduced, thereby enabling compaction of the cultivated field to be suppressed. Namely, this enables low-compaction performance to be secured.

In the agricultural machinery pneumatic tire 10 of the present exemplary embodiment, since there is no need to intentionally reduce the internal pressure in order to reduce the ground contact pressure, the bead portions 12 do not tilt over more than required, and there is no reduction in the durability of the bead portions 12.

In tires such as truck or bus tires set with a higher internal pressure than agricultural machinery pneumatic tires, a large tension acts on the carcass in the radial direction due to the high internal pressure. Thus, even if a recessed portion is formed in the side rubber layer forming each tire side portion, the carcass with a large tension acting thereon maintains the tire shape, and so a tire radial direction outside portion does not tilt over from the recessed portion. However, in agricultural machinery pneumatic tires 10 such as that in the present exemplary embodiment, there is a lower internal pressure and weaker tension acting on the carcass 20. Thus, the force of the carcass 20 to maintain the tire shape is weaker than in truck or bus tires, for example, and each tire side portion 38 at the tire radial direction outside is capable of being tilted over toward the tire width direction outside with the recessed portion 56 as a point of origin.

Thus, if the recessed portion 56 is too shallow, the tire side portion 38 at the tire radial direction outside is unable to tilt over toward the tire width direction outside with the recessed portion 56 as a point of origin, and ground contact pressure cannot be reduced. However, if the recessed portion 56 is too deep, there is a large amount of tilting and strain in the vicinity of the recessed portion 56 becomes too large, leading to damage to the tire side portion 38.

Thus, in the agricultural machinery pneumatic tire 10 of the present exemplary embodiment, although each tire side portion 38 at the tire radial direction outside tilts over toward the tire width direction outside directly below the tire rotation axis with the recessed portion 56 as a point of origin, the shock-absorbing rubber layer 54 is disposed between the carcass 20 and the part of the side rubber layer 40 where the maximum depth portion Dmax of the recessed portion 56 is formed. Thus, strain in the vicinity of the recessed portion 56 of the side rubber layer 40 is suppressed by the shock-absorbing rubber layer 54 from being transmitted to the carcass 20, and separation is suppressed from occurring on the surface of the carcass 20.

Moreover, in the agricultural machinery pneumatic tire 10 of the present exemplary embodiment, the recessed portion 56 is disposed between the normal line HL1 passing through the maximum width position P and the normal line HL2 passing through the tire radial direction outside end 36e of the bead filler 36. Thus, the recessed portion 56 and the tire radial direction outside end 36e of the bead filler 36 are separated from each other in the tire radial direction, and strain in the vicinity of the recessed portion 56 does not overlap with strain in the vicinity of the tire radial direction outside end 36e of the bead filler 36.

In cases of a configuration in which there is no shock-absorbing rubber layer 54 and only the side reinforcing rubber layer 42 is formed, the rigidity of the respective bead portion 12 is too high, and so durability of the bead portion is negatively affected instead. If the laid-up proportion of the shock-absorbing rubber layer 54 is too great, this defeats the original purpose of providing the side reinforcing rubber layer 42.

The maximum thickness of the shock-absorbing rubber layer 54 is positioned at the height of the tire radial direction outside end 36e of the bead filler 36. This is because when the respective bead portion 12 tilts over, bending with the tire radial direction outside end 36e as a point of origin is more liable to occur, and the position of the tire radial direction outside end 36e is the position that is most liable to be damaged due to strain, and so there is a need to thicken the shock-absorbing rubber layer 54 in order to reduce this strain.

Note that although the shock-absorbing rubber layer 54 is disposed further toward the inside than the line segment PQ, if it is only marginally so, the shock-absorbing function cannot be exhibited, and there is no difference to cases in which the shock-absorbing rubber layer 54 is not provided. Thus, viewed in a tire width direction cross-section, a proportion of the cross-section area of the shock-absorbing rubber layer 54 inside the line segment PQ with respect to the overall cross-section area of the side reinforcing rubber layer 42 and the shock-absorbing rubber layer 54 is preferably 10% or greater. If this proportion is 10% or greater, as long as it is inside the line segment PQ, similar durability of the bead portion can be obtained, whatever the amount of shock-absorbing rubber. Note that the shock-absorbing rubber layer 54 is not limited to the shape illustrated in FIG. 1, and may be seat shaped with a constant thickness.

As long as the maximum depth portion Dmax is formed within the above-described range, part of the recessed portion 56 may be formed further toward the tire radial direction outside than the normal line HL1. However, there is no increase in tilting at the tire radial direction outside from the recessed portion 56 and no contribution to reducing ground contact pressure, and the required gauge of the tire side portion 38 in a region further toward the tire radial direction outside than the normal line HL1 is also insufficient.

The folded-back end 16Be of the folded-back portion 16B of the first carcass ply 16 and the folded-back end 18Be of the folded-back portion 18B of the second carcass ply 18 are disposed in positions that do not overlap the respective recessed portion 56 in tire side-on view. Thus, the side rubber layer 40 is not greatly strained in close proximity to the folded-back end 16Be and the folded-back end 18Be when the recessed portion 56 has deformed, such that stress is suppressed from concentrating in close proximity to the folded-back end 16Be and the folded-back end 18Be, and separation occurring from the folded-back end 16Be or the folded-back end 18Be is suppressed. Note that, although the folded-back end 16Be and the folded-back end 18Be are disposed at the tire radial direction outside of the respective recessed portion 56, they may be disposed at the tire radial direction inside of the recessed portion 56.

Test Examples

In order to confirm the advantageous effects of the present invention, one type of tire that is not formed with a recessed portion at each tire side portion and five types of tire that are formed with a recessed portion at each tire side portion were prepared. Comparisons of road surface ground contact pressure and drum durability were then performed.

Configuration of Test Tires 1 to 6

Test Tire 1 is a tire that does not include a recessed portion at each tire side portion, and Test Tires 2 to 6 are tires that do include a recessed portion at each tire side portion.

Tire size: 420/70R28
Rim width: W13
Internal pressure: 160 kPa
Load: 2010 kg
Side rubber layer: modulus at 100% elongation of 3.9 MPa
Tread rubber layer: modulus at 100% elongation of 5.5 MPa
Bead filler: modulus at 100% elongation of 8.0 MPa, height being 15% of SH
Side reinforcing rubber layer: modulus at 100% elongation of 4.0 MPa
Shock-absorbing rubber layer: modulus at 100% elongation of 1.5 MPa
Covering rubber of carcass ply: modulus at 100% elongation of 1.5 MPa
Tire radial direction length of recessed portion: 40 mm
Position of tire radial direction inside end of recessed portion: positioned at 10 mm toward tire radial direction outside of tire radial direction outside end of bent face portion.

Road Surface Ground Contact Pressure

Figure 3:
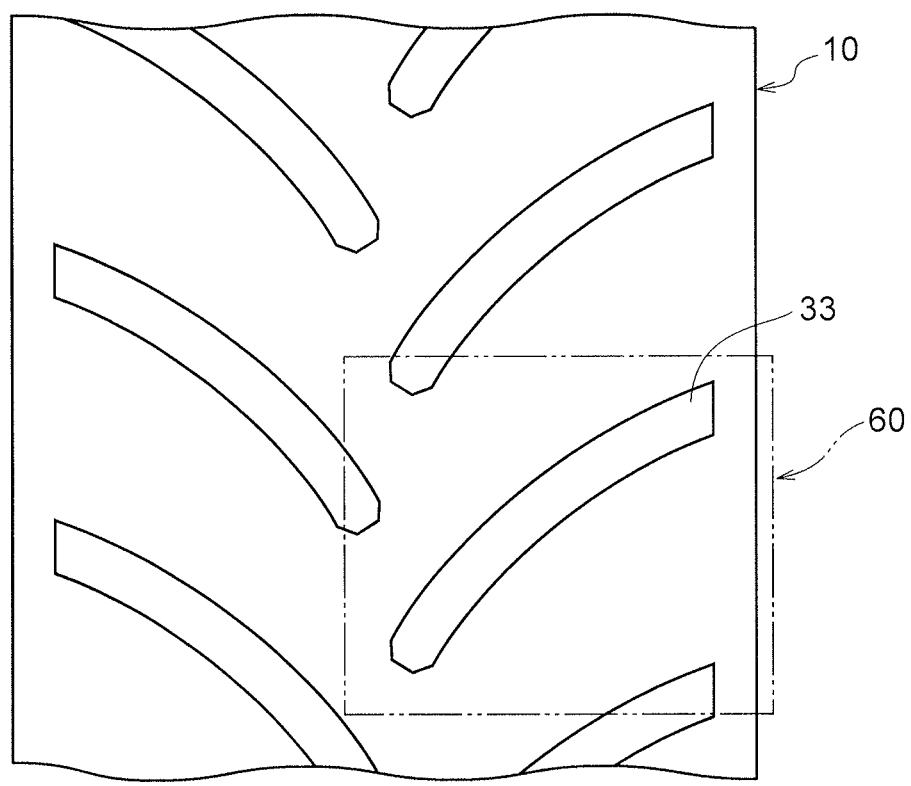
FIG. 3 is a plan view illustrating a positional relationship of an agricultural machinery pneumatic tire with respect to a pressure sensor sheet.

As illustrated in FIG. 3, a pressure sensor sheet 60 of a film-type pressure distribution measuring system made by American manufacturer TEKSCAN, Inc. was placed on a road surface. The tread portion of the agricultural machinery pneumatic tire 10 for testing was pressed onto the pressure sensor sheet 60, and the ground contact pressure per unit surface area was measured. Note that each test tire was placed such that at least one entire lug 33 was placed on the pressure sensor sheet 60. The test results are shown as an index with the Tire 1 as a reference. As shown, the smaller the value, the lower the ground contact pressure per unit surface area and the better the compaction performance.

Indoor Drum Test

Each test tire was made to roll continuously on a drum of drum test machine at a speed of 16 km/h. The running duration until separation of a bead portion occurred was measured, and the levels of drum durability were compared. The levels of drum durability are shown as an index with reference to the Tire 1. The larger the value indicates the longer the running duration and the better the durability of the bead portions.

40 side rubber layer
42 side reinforcing rubber layer
50 bent face portion
54 shock-absorbing rubber layer
56 recessed portion
Dmax maximum depth portion
HL1 normal line
HL2 normal line
P maximum width position
Q inflection point
PQ line segment

TABLE 1

|  | Tire 1 without recessed portion | Tire 2 with recessed portion | Tire 3 with recessed portion | Tire 4 with recessed portion | Tire 5 with recessed portion | Tire 6 with recessed portion |
| --- | --- | --- | --- | --- | --- | --- |
| Maximum depth of recessed portion (proportion of average thickness G | — | 9% | 10% | 17% | 25% | 26% |
| Road surface ground contact pressure (index) | 100 | 90 | 89 | 86 | 82 | 82 |
| Level of drum durability (index) | 100 | 100 | 100 | 99 | 97 | 97 |

As shown by the test results, it is apparent that agricultural machinery pneumatic tires provided with the recessed portion have a lower ground contact pressure than an agricultural machinery pneumatic tire that is not provided with the recessed portion. Although making the recessed portion deeper reduces the level of drum durability, the results are of testing in which more rigorous continuous running was performed than in actual use, and a reduction of approximately 3% in the drum test would not be an issue in actual use.

An example of an exemplary embodiment of the present invention has been explained above; however, the present invention is not limited thereto, and obviously various other modifications may be implemented within a range not departing from the spirit of the present invention.

In the above exemplary embodiment, each recessed portion 56 is formed continuously around the circumferential direction; however, the recessed portion 56 may be formed intermittently, as long as the advantageous effects thereof can be obtained.

The entire content of the disclosure of Japanese Patent Application No. 2014-31077 filed Feb. 20, 2014 is incorporated by reference in the present specification.

All publications, patent applications and technical standards mentioned in the present specification are incorporated by reference in the present specification to the same extent as if the individual publication, patent application, or technical standard was specifically and individually indicated to be incorporated by reference.

EXPLANATION OF THE REFERENCE NUMERALS 10 agricultural machinery pneumatic tire
12 bead portion
16A main body portion
18A main body portion
16B folded-back portion
18B folded-back portion
20 carcass
36 bead filler

The invention claimed is:

1. An agricultural machinery pneumatic tire comprising:
a left and right pair of bead portions that are provided on each side of a tire equatorial plane;
a bead core that is embedded in each of the bead portions;
a carcass that is formed of at least one carcass ply including a main body portion spanning from one of the bead cores to another of the bead cores, and a folded-back portion folded back from a tire radial direction inside toward a tire radial direction outside about each of the bead cores;
a side rubber layer disposed at a tire width direction outside of the carcass;
bead filler that is disposed between the main body portion and the folded-back portion, that extends tapering from the bead cores toward the tire radial direction outside, and that is formed of a rubber set with a higher modulus at 100% elongation than a rubber configuring the side rubber layer;
a bent face portion that is formed at the bead portions so as to face a flange of a rim and that is formed in a recessed shape as viewed in a tire width direction cross-section;
a side reinforcing rubber layer that is disposed at the tire width direction outside of the carcass, that includes the bent face portion and extends from the bent face portion toward the tire radial direction outside, and that is formed of a rubber set with a higher modulus at 100% elongation than the rubber configuring the side rubber layer;
a shock-absorbing rubber layer that is provided between the side reinforcing rubber layer and the carcass and that is formed of a rubber set with a lower modulus at 100% elongation than the rubber configuring the side reinforcing rubber layer; and
a recessed portion that, in a mounted position in which the tire is mounted to an applicable rim and inflated to a maximum air pressure in an unladen state and as viewed in a tire width direction cross-section, has a maximum depth portion disposed at an outer face of the side rubber layer, between a normal line HL1 that passes through a maximum width position P, P being a maximum width position of the main body portion, and is orthogonal to a tangent line of a tire outer outline, and a normal line HL2 that passes through a tire radial direction outside end of the bead filler and is orthogonal to a tangent line of the tire outer outline, wherein a ply end of the folded-back portion is positioned further toward the tire radial direction outside than an outside tire radial end of the recessed portion, and an outside tire radial end of the shock-absorbing rubber layer is positioned further toward the tire radial direction inside than the outside tire radial end of the recessed portion and is positioned further toward the tire width direction inside than an inside tire radial end of the recessed portion.

2. The agricultural machinery pneumatic tire of claim 1, wherein at least part of the shock-absorbing rubber layer is disposed between the carcass and a part of the side rubber layer where the maximum depth portion of the recessed portion is formed.

3. The agricultural machinery pneumatic tire of claim 1, wherein the maximum depth of the recessed portion is set within a range of from 10% to 26% of an average thickness G of a tire side portion between the normal line HL2 and the normal line HL1.

4. The agricultural machinery pneumatic tire of claim 1, wherein:
in an unladen state mounted to an applicable rim and inflated to a maximum air pressure, the shock-absorbing rubber layer is laid up further toward a tire width direction inside than a line segment PQ linking the maximum width position P to an inflection point Q, Q being an inflection point between the bent face portion formed in a recessed shape and a bead heel curving in a bulge toward the tire outside.

5. The agricultural machinery pneumatic tire of claim 1, wherein:
the outside tire radial end of the shock-absorbing rubber layer is positioned further toward the tire radial direction outside than an outside tire radial end of the side reinforcing rubber layer.

6. The agricultural machinery pneumatic tire of claim 1, wherein:
the recessed portion, the side reinforcing rubber layer and the shock-absorbing rubber layer overlap each other in the tire width direction.

* * * * *